United States Patent
Park et al.

(10) Patent No.: US 7,656,776 B2
(45) Date of Patent: Feb. 2, 2010

(54) DATA STORING AND READING APPARATUS FOR STORING DATA IN A NANO-DEVICE

(75) Inventors: Jong Hyurk Park, Daegu-shi (KR); Seong Jae Lee, Daejeon-shi (KR)

(73) Assignee: Electronics and Telecommunications Research Institute, Daejeon-Shi (KR)

( * ) Notice: Subject to any disclaimer, the term of this patent is extended or adjusted under 35 U.S.C. 154(b) by 586 days.

(21) Appl. No.: 10/981,550

(22) Filed: Nov. 5, 2004

(65) Prior Publication Data

US 2005/0141397 A1 Jun. 30, 2005

(30) Foreign Application Priority Data

Dec. 26, 2003 (KR) .................. 10-2003-0097070

(51) Int. Cl.
*G11B 9/00* (2006.01)
(52) U.S. Cl. ....................... 369/126; 369/101
(58) Field of Classification Search ............. 369/126, 369/101
See application file for complete search history.

(56) References Cited

U.S. PATENT DOCUMENTS

| | | | | |
|---|---|---|---|---|
| 5,481,527 A | * | 1/1996 | Kasanuki et al. | 369/126 |
| 5,581,538 A | * | 12/1996 | Inui et al. | 369/126 |
| 5,675,532 A | | 10/1997 | Gemma et al. | |
| 5,777,977 A | * | 7/1998 | Fujiwara et al. | 369/126 |
| 5,946,284 A | * | 8/1999 | Chung et al. | 369/126 |
| 5,978,256 A | * | 11/1999 | Sohn et al. | 365/151 |
| 6,040,848 A | * | 3/2000 | Shido et al. | 347/159 |
| 6,101,164 A | | 8/2000 | Kado et al. | |
| 6,246,652 B1 | * | 6/2001 | Kikukawa et al. | 369/53.38 |
| 6,519,221 B1 | | 2/2003 | Manalis et al. | |
| 6,587,408 B1 | * | 7/2003 | Jacobson et al. | 369/44.16 |
| 2002/0168825 A1 | * | 11/2002 | Kim et al. | 438/287 |
| 2004/0137704 A1 | * | 7/2004 | Kim et al. | 438/593 |

FOREIGN PATENT DOCUMENTS

| KR | 100265692 | 6/2000 |
|---|---|---|
| KR | 1020010026736 | 4/2001 |

OTHER PUBLICATIONS

International Office Action for EP 04104657.4, Jun. 15, 2007.
B. Rezek, et al.; "Charge storage in undoped hydrogenated amorphous silicon by ambient atomic force microscopy"; Applied Physics Letters; vol. 83, No. 9; 2003; pp. 1764-1766.

* cited by examiner

*Primary Examiner*—Wayne R Young
*Assistant Examiner*—LaTanya Bibbins
(74) *Attorney, Agent, or Firm*—Lowe Hauptman Ham & Berner, LLP

(57) ABSTRACT

Provided is a data storing and reading apparatus for storing and reading data using a nano device with nano-dots dots regularly arranged, comprising a probe movable by a cantilever so as to be placed onto each nano-dot of the nano device, a bias power supply unit for supplying a storing bias voltage and a reading bias voltage between the probe and the nano device, a light beam generator for generating a light beam to detect a position of the probe, a position detector for detecting the light beam reflected from the probe, an amplifier for amplifying an output signal of the position detector, and a detection circuit for reading data stored in the nano-dot using an output signal of the amplifier.

8 Claims, 4 Drawing Sheets

DATA STORING AND READING APPARATUS FOR STORING DATA IN A NANO-DEVICE

BACKGROUND

1. Field of the Invention

The present invention generally relates to a data storing and reading apparatus, and more particularly, to a data storing and reading apparatus for electrically recording and storing data in a nano device that uniform size of nano-dots are regularly arranged and reading the data from the nano device.

2. Discussion of Related Art

There have been several kinds of data storing and reading apparatuses, a magnetic storage device, an optical storage device and an electronic storage device. The magnetic storage device is commonly used for a large amount of data and the optical storage device is mainly for potable electronic devices.

Recently, electronic storage devices such as a flash memory which stores data using electric signals are developed and getting rapidly popularized due to rapid technical progress and cost reduction. However, all the conventional data storage devices have problems below.

As for the magnetic storage device, the maximum storage density is limited due to superparamagnetic limit even though sensitivity of a sensor is highly increased. The optical storage device can not increase its maximum storage density due to diffraction limit determined by wavelength of light and numerical aperture of a lens. As for the electronic storage device, since a storage medium for storing the electric signal is not limited in size, storage density can be increased to a great extent as long as the sensitivity of the sensor for detecting electrical charges is increased.

The electrical data storing is accomplished by injecting electrical charges into a $SiN_xO_y$ layer for a flash memory and using dielectric polarization of a ferroelectric material with a high dielectric constant for a ferroelectric random access memory (FRAM). However, the flash memory has problems that it is difficult to control storage density since the charge injection area exists in a trap state of an interface of the $SiN_xO_y$ layer and it exhibits fatigue as the storing operations are repeated. The FRAM has a problem that as a size of the ferroelectric material decreases, polarization intensity is reduced and ferroelectricity will be lost. Further, imprint and retention of the FRAM are degraded due to hydrogen-induced thermal damage caused during manufacturing processes and repeated storing operations.

SUMMARY OF THE INVENTION

The present invention is directed to a data storing and reading apparatus capable of storing data into a nano device with nano dots regularly arranged and reading the data from the nano device, thereby increasing storage density and data reproduction speed.

One aspect of the present invention is to provide a data storing and reading apparatus for storing data in a nano device with a plurality of nano-dots and reading the data from the nano device, comprising a probe movable by a cantilever so as to be placed onto each nano-dot of the nano device, a bias power supply unit for supplying a storing bias voltage and a reading bias voltage between the probe and the nano device, a light beam generator for generating a light beam to detect a position of the probe, a position detector for detecting the light beam reflected from the probe, an amplifier for amplifying an output signal of the position detector, and a detection circuit for reading data stored in the nano-dot using an output signal of the amplifier.

Here, the probe and the cantilever may be provided by an atomic force microscope (AFM).

Preferably, the storing bias voltage is a DC voltage and the reading bias voltage is an AC voltage.

Further preferably, the beam generator includes a laser diode and the position detector includes a photo diode.

Still further preferably, the data storing and reading apparatus may further includes a switching means for selectively operating the bias power supply unit for data storing and reading operations.

The data storing and reading apparatus may further include a circuit for providing an initialization signal to initialize the position of the probe.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The purpose and advantages of the present invention will be more apparent by describing in detail an exemplary embodiment thereof with reference to the attached drawings in which:

FIG. 2b is a cross-sectional view of the nano device shown in FIG. 2a; and

DETAILED DESCRIPTION OF PREFERRED EMBODIMENTS

If charges are injected into metal or semiconductor nano-dots, charge can be stored in the nano-dots. Further, by controlling the amplitude of the charges to be stored in the nano-dots, the data can be controlled in multi-level and storage density and speed can be greatly increased.

According to results of recent researches, nano dots with several or several tens of nanometers can be realized. Nano structures are usually formed using electron beams. However, such an electron beam technology is not suitable for fabrication of memory devices due to low throughput since the electron beam technology makes the nano structures one by one.

To solve such a problem, a method of using a self-aligned $Al_2O_3$ or polymer template surface in combination with a highly integrated nano-dot manufacturing process is suggested to make nano-dots regularly arranged over a large area. By using a template technology, highly integrated nano-dots can be fabricated over a large area at low cost in short time and the template technology has an advantage of being compatible with conventional semiconductor device manufacturing processes. Therefore, if a data storing and reading apparatus can be realized a combination of the manufacturing technology of a nano-dots memory which uses a nano-dots template, and an atomic force microscope (AFM) with nano-scale resolving power, a very large scale data storage device operating at high speed may be realized, too, based on the data storing and reading apparatus with nano-dots.

Now, a data storing and reading apparatus in accordance with the exemplary embodiment of the present invention will be described in detail below.

Figure 1:
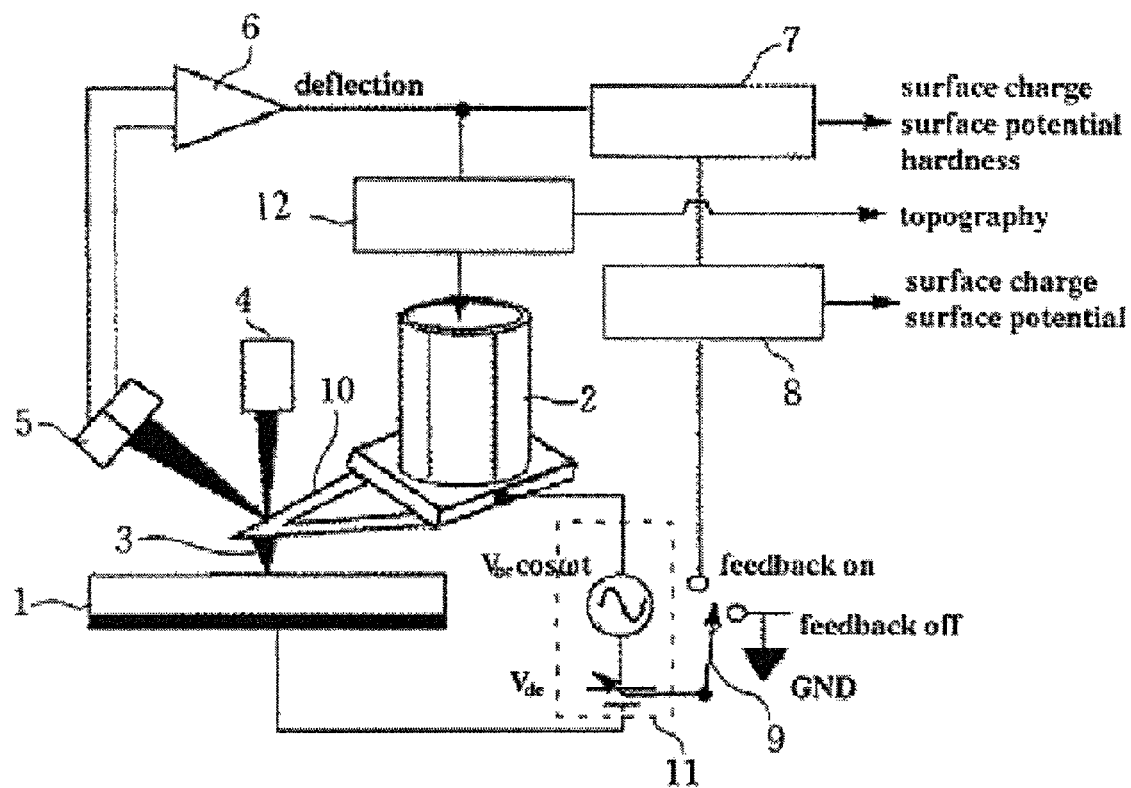
FIG. 1 is a schematic diagram of a data storing and reading apparatus in accordance with an exemplary embodiment of the present invention.
Figure 2A:
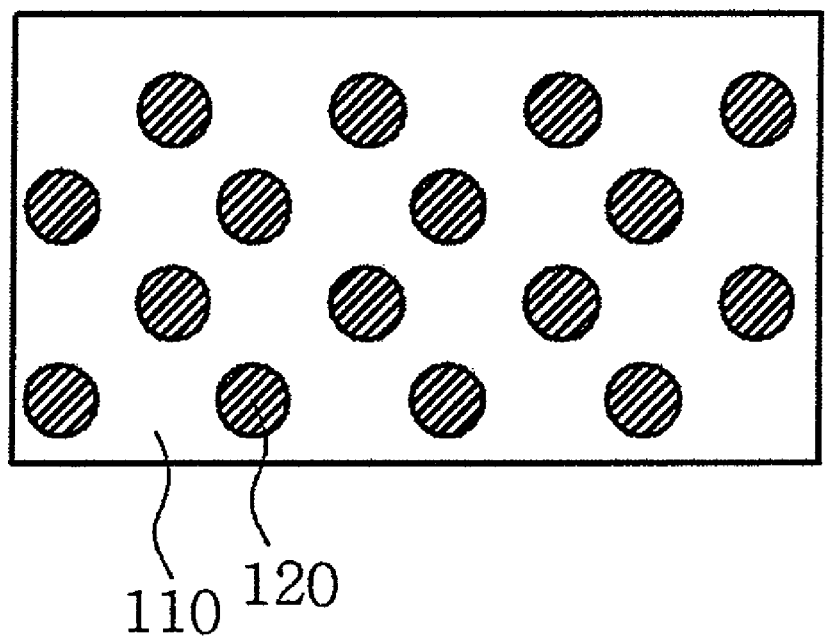
FIG. 2a is a plan view of a nano device with a plurality of nano-dots regularly arranged.
Figure 2B:
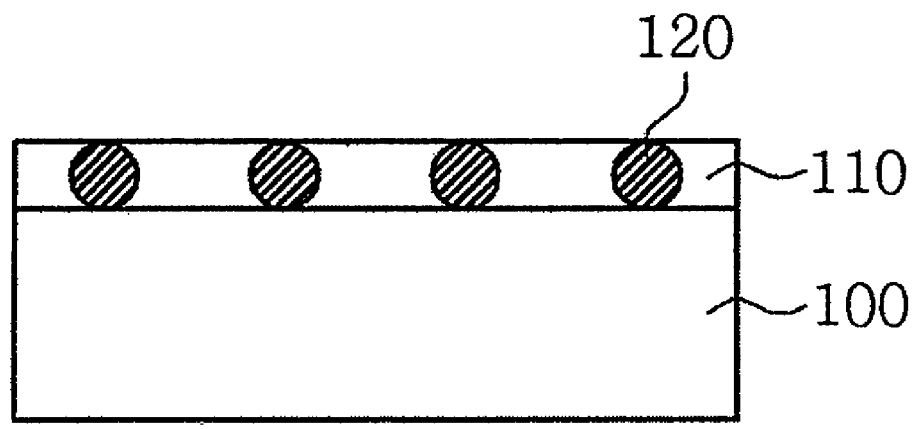

FIG. 1 is a schematic diagram of a data storing and reading apparatus in accordance with an exemplary embodiment of the present invention. FIG. 2a and FIG. 2b are a plan view and a cross-sectional view of a nano device, respectively, in a data storing and reading apparatus in accordance with an exemplary embodiment of the present invention.

Referring to FIG. 2a and FIG. 2b, a plurality of metal or semiconductor nano-dots 120 are regularly arranged on a substrate 100, and each of the nano-dots 120 is electrically insulated from each other by an insulating layer 110 such as an oxide layer.

Data storing and reading operations of the nano device shown in FIG. 2a and FIG. 2b will be described with reference to FIG. 1.

On the nano-dot 120 of the nano-device, a probe 3 movable by a cantilever 10 is placed. While the probe 3 is placed on the nano-dot 120, a storing bias voltage or a reading bias voltage is applied across the probe 3 and the nano-device by a bias power supply unit 11.

A light beam generator 4 generates a light beam to detect a position of the probe 3. A position detector 5 detects the light beam reflected from the probe 3 and generates an electrical signal. The electric signal output from the position detector 5 is amplified by an amplifier 6 and the amplified signal is input to a detection circuit 7. The detection circuit 7 reads the data stored in the nano-dot 120 from the amplified signal.

The bias power supply unit 11 selectively outputs a direct current (DC) bias voltage $V_{dc}$ and an alternating current (AC) bias voltage $V_{ac}$ for the storing and reading operations. The bias power supply unit 11 is controlled by a switch 9 operating in response to an output signal of a feed-back loop circuit 8 which receives a signal from the detection circuit 7. That is, the bias power supply unit 11 supplies the DC bias voltage $V_{dc}$ between the probe 3 and the nano device for storing operation, and supplies the AC bias voltage $V_{ac}$ between the probe 3 and the nano device for reading operation.

If one cycle of storing and reading operations is finished, the probe 3 must be back to a predetermined place. At this time, an initialization circuit 12 provides an initialization signal to a cantilever driving unit 2 in response to the output signal of the amplifier 6, thereby moving the probe 3 to a predetermined place.

The cantilever 10 and the probe 3 are provided from an atomic force microscope (AFM) with nano-scale resolving power. The AFM drives the cantilever 10 and the probe 3 using a piezo element to have nano-scale spatial resolution. The beam generator 4 comprises a laser diode and the position detector 5 comprises a photo diode.

The storing and reading operations of the data storing and reading apparatus in accordance with the present invention will be described below.

<Storing>

When a data storing signal is generated from a data processing apparatus (not shown) and input to the data storing and reading apparatus in accordance with the present invention, the cantilever driving unit 2 moves the probe 3 onto the nano-dot 120. At this time, the bias power supply unit 11 supplies the DC bias voltage $V_{dc}$ between the probe 3 and the nano device, thereby injecting charges into the nano-dot 120. At this time, by controlling polarity and amplitude of the bias voltage to be applied between the probe 3 and the nano device, multi-level of data can be stored in the nano-dots.

Figure 3A:
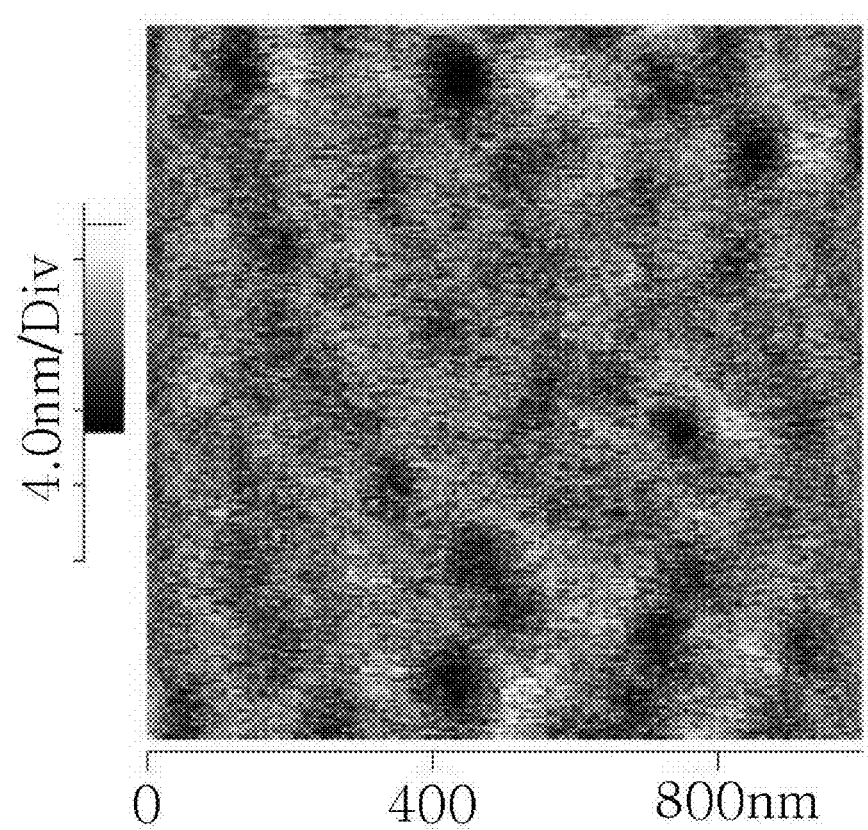
FIGS. 3a, 3b and 3c illustrate distribution of charges in nano-dots.
Figure 3B:
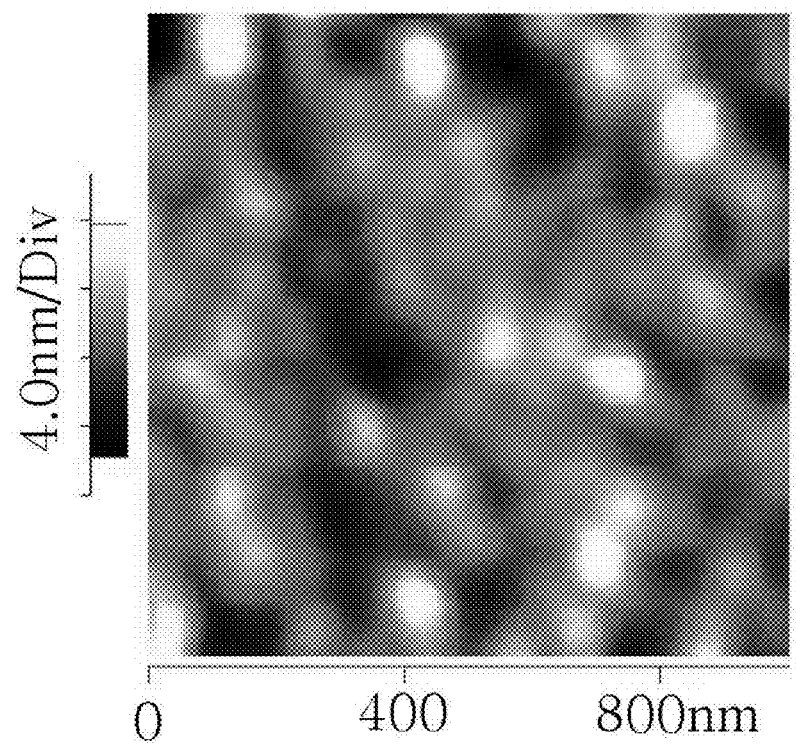
Figure 3C:
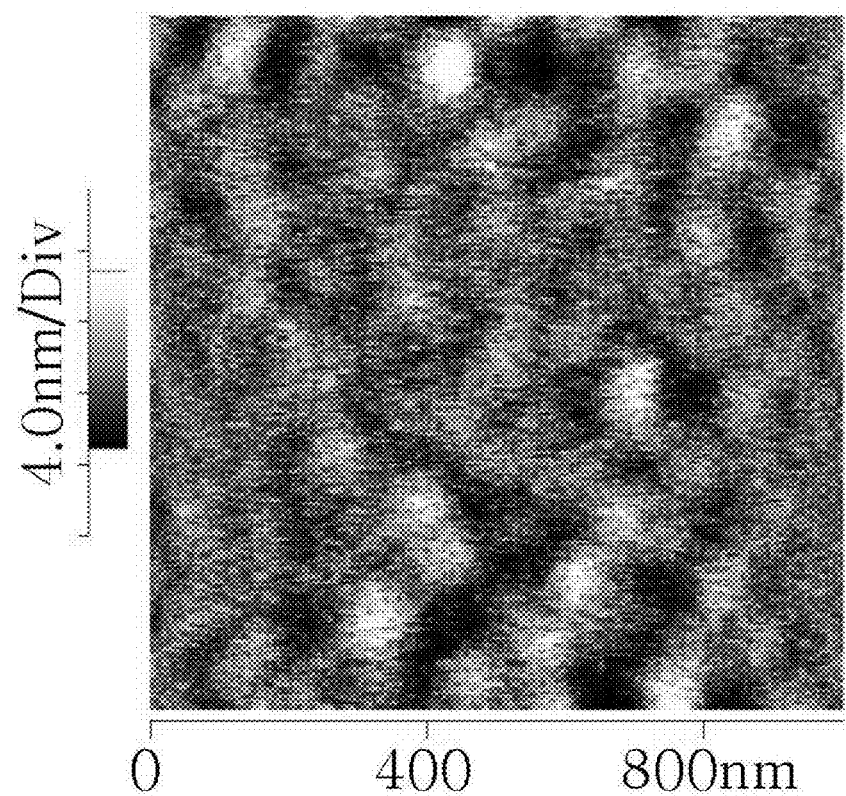

For example, in a nano device with 50 nm of metal nano-dots which are regularly arranged, it is possible to charge the nano-dots to the extent level that is needed by applying the DC bias voltage $V_{dc}$ between the probe 3 and the nano device. As the amount of charges distributed in the nano-dots can be quantitatively observed using the probe of the AFM. FIG. 3a illustrates topography i.e. distribution of the nano-dots. FIG. 3b illustrates distribution of charges in a nano-dot when plus bias voltage is applied between the probe and nano device. FIG. 3c illustrates distribution of charges in a nano-dot when minus voltage is applied between the probe and nano device. That is, the amplitude of charges independently stored in each nano-dot can be observed according to the voltage applied between the probe and nano device. Further, polarity and amplitude of the charges to be stored in the nano-dots can be continuously controlled by changing the bias voltages applied between the probe and the nano device.

<Reading>

When a data reading signal is generated from a data processing apparatus (not shown) and input to the nano device, the cantilever driving unit 120 moves the probe 3 onto a nano-dot with data to be read. Next, the AC bias voltage $V_{ac}$ is applied between the probe 3 and the nano device from the bias power supply unit 11, and the probe 3 moves for a distance corresponding to the amount of charges injected into the nano-dot 120. At this time, a light beam generated from the beam generator 4 is reflected from the probe 3 and the reflected light beam is incident to the position detector 5. The position detector 5 generates an electrical signal corresponding to the distance of the movement of the probe 3. At this time, since the electrical signal is so weak, it is amplified by the amplifier 6 and the amplified signal is input to the detection circuit 7. The detection circuit 7 reads the data stored in the nano-dot 12 from the amplified signal. That is, the data in the nano-dot 120 can be read by detecting amount of charges in the nano-dot 120.

The nano-dots of the nano device in accordance with the present invention can be manufactured by a metal or semiconductor deposition process on a block copolymer or $Al_2O_3$ template, and a lift-off process. That is, after preparing a template with a nano-lattice structure using a self-aligned block copolymer, metal or semiconductor nano-dot lattice is formed by depositing a metal or semiconductor material on the template. The nano device further comprises an upper and lower insulating layers formed of metal oxide, silicon oxide or nitride, and a lower electrode to store the charges.

As described above, it is possible to electrically store data into a nano device with nano-dots regularly arranged and read the data from the nano-dots. Further, by controlling polarity and amplitude of charges to be stored in the nano-dots, and controlling amplitude of charges stored in the nano-dots, multi-level of data can be stored in the nano-dots. Accordingly, if the present invention is applied to a nano device with nano-dots arranged on a large area of substrate with high density, data storage density may be increased and data processing speed will be improved. Further, a high density high speed data storage device capable of storing multi-level data can be realized.

Although the exemplary embodiment of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A data storing and reading apparatus for storing and reading data in a nano device having a plurality of uniformlysized and regularly arranged metal or semiconductor nano-dots insulated from each other by an insulating layer, comprising:

a probe movable by a cantilever so as to be placed onto each nano-dot of the nano device;

a bias power supply unit for supplying a storing bias voltage and a reading bias voltage between the probe and the nano device;

a light beam generator for generating a light beam to detect a position of the probe;

a position detector for detecting the light beam reflected from the probe and generating an output signal corresponding to a distance moved by the probe;

an amplifier for amplifying an output signal of the position detector; and a detection circuit for reading the data stored in the nano-dot in response to an output signal of the position detector amplified by the amplifier, wherein the probe is movable for a distance corresponding to an amount of charges stored in the nano-dots;

wherein the data is stored in multiple levels in the nano-dots; and wherein the bias power supply unit is configured to continuously control polarity and amplitude of charges stored in the nano-dots by changing the storing bias voltage applied between the probe and the nano device.

2. The apparatus according to claim 1, wherein the probe and the cantilever are provided by an atomic force microscope (AFM).

3. The apparatus according to claim 1, wherein the storing bias voltage is a DC voltage and the reading voltage is an AC voltage.

4. The apparatus according to claim 1, wherein the light beam generator includes a laser diode and the position detector includes a photo diode.

5. The apparatus according to claim 1, further comprising a switching means for selectively operating the bias power supply unit for data storing and reading operations.

6. The apparatus according to claim 1, further comprising a circuit for providing an initialization signal to initialize the position of the probe.

7. The apparatus according to claim 1, wherein during a storing operation, the probe moves onto a nano-dot and the bias power supply unit supplies the storing bias voltage between the probe and the nano device to inject charges into the nano-dot.

8. The apparatus according to claim 1, wherein during a read operation, the bias power supply unit supplies the reading bias voltage between the probe and a nano-dot so that the probe on the nano-dot moves a distance according to an amount of charges stored in the nano-dot of the nano device.

* * * * *